Oct. 19, 1926.

VON GLOVER FERGUSON

AUTOMATIC FISHHOOK

Filed Jan. 21, 1926

1,604,031

WITNESSES
Guy M Spring

INVENTOR.
VON G. FERGUSON
BY
Richard Owen, ATTORNEY.

Patented Oct. 19, 1926.

1,604,031

UNITED STATES PATENT OFFICE.

VON GLOVER FERGUSON, OF CEDAR GROVE, LOUISIANA.

AUTOMATIC FISHHOOK.

Application filed January 21, 1926. Serial No. 82,827.

This invention relates to fish hooks, and has for its object the production of a simple and efficient hook which will grip the fish as soon as the fish is caught by the hook, in such a manner as to prevent the fish from becoming accidentally detached from the hook.

Another object of this invention is the production of a simple automatic gripping device for a fishing hook, which is adapted to prevent the accidental disengagement of a fish from the hook.

Other objects and advantages of the present invention will appear throughout the following specification and claims.

Figure 1:
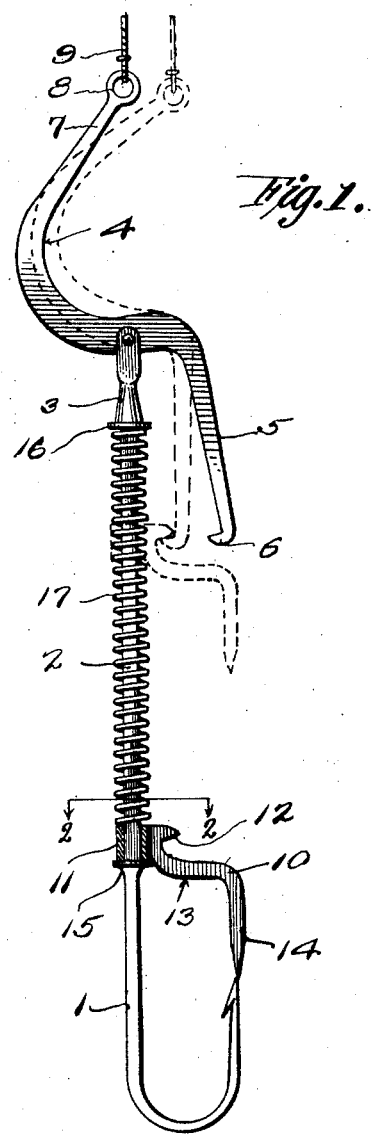
Figure 1 is a side elevation of the fish hook.
Figure 2:
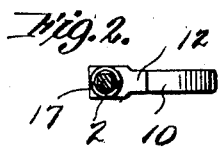
Figure 2 is a section taken on line 2—2 of Figure 1.

By referring to the drawings it will be seen that 1 designates the fish hook of the usual construction, which is provided with an elongated shank 2 extending vertically from the hook 1. This shank 2 is preferably square in cross section and carries at its upper end a bifurcated cap 3, upon which is pivotally secured the trigger member 4.

The trigger member 4 is provided with a downwardly extending trigger finger 5, having a trigger hook 6 formed at its lower extremity. The trigger 4 terminates just above the finger 5 in a laterally extending upwardly curved tripping arm 7, the arm 7 being extended so as to overhang the pivot point of the trigger 4, when the trigger is in an unlocked position, and extends beyond the line of pivot when the trigger is in a locked position. The trigger 4 is provided at its outer end with an eye 8, to which is adapted to be secured the usual fishing line 9.

A sliding spear 10 is carried by the shank 2 and is provided with a sleeve 11 which is slidably mounted upon the shank 2. The sleeve 11 carries a hook 12, which is adapted to engage the hook 6 of the trigger 4 as shown in dotted lines in Figure 1. The spear 10 comprises a laterally extending shank 13 which terminates in a downwardly extending spur 14, the lower end of the spur 14 being adapted to engage the upper point of the fish hook 1, when the spear 10 is released from the trigger 4. A stop shoulder 15 is formed at the junction of the hook 1 with the shank 2 and constitutes a stop for limiting the downward movement of the spear 10 upon the shank 2. A stop shoulder 16 is formed upon the shank 2 near the cap 3 and constitutes a stop for one end of the spring 17, which is mounted upon the shank 2. The opposite end of the spring 17 engages the sleeve 11 and normally urges the spear 10 downwardly upon the shank 2, when the spear is released from the trigger 4.

In operation, the usual bait is placed upon the hook 1 and the trigger 4 is secured to the usual fishing line and the device thrown overboard. As soon as a fish bites the bait carried by the hook 1 and pulls upon the same, the trigger 4 will be swung from the position shown in dotted lines to the position shown in full lines in Figure 1, thereby releasing the hook 6 from the hook 12. The spring 17 will then force the spear downwardly upon the shank 2 and drive the spur 14 into the head of the fish, holding the fish in firm engagement with the hook 1.

It should be understood that certain detail changes may be made in the structure above described without departing from the spirit of the invention, so long as these changes fall within the scope of the appended claims.

Having described the invention, what is claimed is:

1. A fish hook comprising a hook formed with a shank, a trigger pivotally secured to the shank and adapted to have a fishing line secured to one end thereof, and a spear slidable on the shank of the hook and releasably engaging the said trigger and adapted to engage the hook for firmly holding a fish in engagement therewith.

2. A device of the class described, comprising a hook having a shank, a spear slidably mounted upon the shank of the hook, a spring encircling the said shank for normally urging the spear in engagement with the hook, and a trigger also secured to the shank of the hook and adapted to have a fishing line secured to one end thereof, the other end of the said trigger releasably engaging the spear.

3. A device of the class described a hook, a shank carried thereby, a sleeve slidably engaging the shank and provided with a right angularly formed spur adapted to engage the point of the hook, a coil spring carried by the shank and urging the spear into engagement with the hook, a trigger member pivotally carried by the upper end of the shank, the trigger provided with a downwardly extending finger having a hook at its lower extremity, said trigger provided with a laterally and upwardly curved arm having its end projecting beyond the pivotal connection of the shank with the trigger, for causing the trigger finger to be disengaged from the spear when pressure is exerted upon the fish hook, and means for facilitating the connection of a fishing line with the outer end of the trigger.

4. A device of the class described comprising a hook having an elongated angular shank and a stop shoulder, a spear slidably mounted upon the shank and limited in its downward movement by the said stop shoulder, a coil spring encircling the shank and normally urging the spear into engagement with the hook, a trigger member pivotally secured intermediate its ends upon the upper end of the shank of said hook, said trigger being provided with a downwardly extending finger having a hook for releasable engagement with the spear and being further provided with a laterally and upwardly curved arm adapted to have a fishing line secured thereto.

5. A device of the class described comprising a hook having a shank and a stop shoulder, a spear slidably mounted upon the shank and limited in its downward movement by the said stop shoulder, a spring encircling the said shank for normally urging the spear in engagement with the hook, and a trigger pivotally secured intermediate its ends to the upper end of the shank and adapted to have a fishing line secured to one end thereof, the other end of the said trigger adapted to releasably engage the said spear.

In testimony whereof I affix my signature.

VON GLOVER FERGUSON.